US009454435B2

(12) United States Patent
Belluomini et al.

(10) Patent No.: US 9,454,435 B2
(45) Date of Patent: *Sep. 27, 2016

(54) WRITE PERFORMANCE IN FAULT-TOLERANT CLUSTERED STORAGE SYSTEMS

(71) Applicant: International Business Machines Corporation, Armonk, NY (US)

(72) Inventors: Wendy A. Belluomini, San Jose, CA (US); Karan Gupta, San Jose, CA (US); Dean Hildebrand, San Jose, CA (US); Anna S. Povzner, San Jose, CA (US); Himabindu Pucha, San Jose, CA (US); Renu Tewari, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 505 days.

This patent is subject to a terminal disclaimer.

(21) Appl. No.: 14/014,852

(22) Filed: Aug. 30, 2013

(65) Prior Publication Data

US 2014/0173185 A1 Jun. 19, 2014

Related U.S. Application Data

(63) Continuation of application No. 13/719,590, filed on Dec. 19, 2012, now Pat. No. 9,152,501.

(51) Int. Cl.
*G06F 11/00* (2006.01)
*G06F 11/14* (2006.01)
(Continued)

(52) U.S. Cl.
CPC ....... *G06F 11/1415* (2013.01); *G06F 11/1666* (2013.01); *G06F 17/30132* (2013.01);
(Continued)

(58) Field of Classification Search
CPC .......... G06F 11/1412; G06F 11/0709; G06F 11/14; G06F 11/1425; G06F 11/1435; G06F 11/1441; G06F 11/1458; G06F 11/1415; G06F 11/1666; G06F 11/20; G06F 17/30132; G06F 17/30362; G06F 17/30371; G06F 17/30174; G06F 17/30581; G06F 2201/825; H04L 67/2842; H04L 67/1095
USPC ......... 714/20, 2, 4.1, 6.1, 6.3; 707/822, 610, 707/619
See application file for complete search history.

(56) References Cited

U.S. PATENT DOCUMENTS 6,115,804 A 9/2000 Carpenter et al.
7,624,155 B1 * 11/2009 Nordin ................ G06F 11/2094
709/208
(Continued)

FOREIGN PATENT DOCUMENTS

CN 1690986 11/2005
CN 101042680 9/2007

OTHER PUBLICATIONS

Stodolsky et al., Parity Logging Overcoming the Small Write Problem in Redundant Disk Arrays, IEEE, 1993.
(Continued)

*Primary Examiner* — Joseph D Manoskey
(74) *Attorney, Agent, or Firm* — Lieberman & Brandsdorfer, LLC

(57) ABSTRACT

Embodiments of the invention relate to supporting transaction data committed to a stable storage. Committed data in the cluster is stored in the persistent cache layer and replicated and stored in the cache layer of one or more secondary nodes. One copy is designated as a master copy and all other copies are designated as replica, with an exclusive write lock assigned to the master and a shared write lock extended to the replica. An acknowledgement of receiving the data is communicated following confirmation that the data has been replicated to each node designated to receive the replica. Managers and a director are provided to support management of the master copy and the replicas within the file system, including invalidation of replicas, fault tolerance associated with failure of a node holding a master copy, recovery from a failed node, recovered of the file system from a power failure, and transferring master and replica copies within the file system.

9 Claims, 7 Drawing Sheets

(51) Int. Cl.
 *G06F 17/30* (2006.01)
 *H04L 29/08* (2006.01)
 *G06F 11/16* (2006.01)
 *G06F 11/20* (2006.01)

(52) U.S. Cl.
 CPC ... *G06F17/30174* (2013.01); *G06F 17/30362* (2013.01); *G06F 17/30371* (2013.01); *G06F 17/30581* (2013.01); *H04L 67/1095* (2013.01); *H04L 67/2842* (2013.01); *G06F 11/20* (2013.01); *G06F 2201/825* (2013.01)

(56) References Cited

U.S. PATENT DOCUMENTS

| | | | |
|---|---|---|---|
| 7,827,214 | B1 | 11/2010 | Ghemawat et al. |
| 7,962,779 | B2 | 6/2011 | Patel et al. |
| 7,979,652 | B1 | 7/2011 | Sivasubramanian |
| 8,024,507 | B2 | 9/2011 | Patel et al. |
| 8,041,735 | B1 | 10/2011 | Lacapra et al. |
| 8,065,479 | B2 | 11/2011 | Humlicek |
| 2007/0022129 | A1* | 1/2007 | Bahar .................. G06F 9/5011 |
| 2007/0276983 | A1 | 11/2007 | Zohar et al. |
| 2009/0157766 | A1 | 6/2009 | Shen et al. |
| 2009/0217274 | A1 | 8/2009 | Corbin et al. |
| 2009/0319600 | A1 | 12/2009 | Sedan et al. |
| 2010/0005246 | A1 | 1/2010 | Beers et al. |
| 2010/0095046 | A1 | 4/2010 | Reid et al. |
| 2010/0191712 | A1 | 7/2010 | Wolman et al. |
| 2010/0299553 | A1 | 11/2010 | Cen |
| 2010/0306448 | A1 | 12/2010 | Chen et al. |
| 2011/0022801 | A1 | 1/2011 | Flynn |

OTHER PUBLICATIONS

Ibm et al., Autonomic Buffer Pool Management to Improve Sequential Read and Write I/O Performance, Jul. 18, 2006.

Xu et al., Using Memcached to Promote Read Throughput in Massive Small-File Storage System, 2010 Ninth International Conference on Grid and Cloud Computing, pp. 24-29, IEEE Computer Society, 2010.

* cited by examiner

WRITE PERFORMANCE IN FAULT-TOLERANT CLUSTERED STORAGE SYSTEMS

CROSS REFERENCE TO RELATED APPLICATION(S)

This application is a continuation patent application claiming the benefit of the filing date of U.S. patent application Ser. No. 13/719,590 file on Dec. 19, 2012 and titled "Write Performance In Fault-Tolerant Clustered Storage Systems," now pending, which is hereby incorporated by reference.

BACKGROUND

The present invention relates to write performance in clustered file systems. More specifically, the invention relates to integrating a file system cache of a clustered storage system with a distributed memory layer to enable efficiency of synchronous write transactions.

Workloads with a plurality of synchronous write operations or a high ratio of commit operations are known to suffer performance penalties. These workloads are common in database workloads with a high ratio of commits. Similarly, web based workloads perform a series of file operations requiring a commit to stable storage when closing a file. Virtual machines have their own block layer, and all write transactions arriving to an underlying storage in the virtualized environment are synchronous and require immediate commit to a stable storage. Each of these operations requires workload data to be written to a storage subsystem before returning an acknowledgement to the client. The performance penalties are reflected in increased write latency because disk access latencies are orders of magnitude higher than dynamic RAM (also referred to herein as DRAM) latencies. In addition, commit operations do not allow the file system to delay a write transaction by gathering a plurality of the write transactions into a single I/O to a storage subsystem. Accordingly, various types of operations that require writing data to a storage subsystem and an associated acknowledgement communication are affected by performance penalties.

BRIEF SUMMARY

This invention comprises a method for mitigating performance penalties associated with synchronous write transactions in a fault-tolerant clustered file system.

In one aspect, a method is provided for mitigating performance penalties associated with synchronous write transactions in the fault-tolerant file system. A page cache layer in the file system is integrated with a stable memory layer to temporarily hold committed data in distributed non-volatile memory of nodes in a cluster. Responsive to receipt of a synchronous write transaction in the file system, data associated with the transaction is placed in the layer and replicated within the layer of at least one node in the cluster. A distinction is made between a master copy and a replica of the received data. The distinction includes applying existing cache policies to the master copy. Following flushing the master copy to persistent storage, each replica on the nodes is invalidated.

In another aspect, a method is provided for mitigating performance penalties associated with write transactions in a fault-tolerant file system. A stable memory layer is integrated with a page cache layer in the file system to temporarily hold data committed to a stable storage in non-volatile memory of cluster nodes. In response to receipt of a synchronous write transaction in the file system, data associated with the received transaction is placed in the layer and replicated within the layer. A master copy and a replica of the received data are maintained. The master copy and the replica have distinguishing characteristics. Existing cache policies are applied to the master copy of the received data, and the replica is invalidated after flushing of the master copy to persistent storage.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

DETAILED DESCRIPTION

Figure 1:
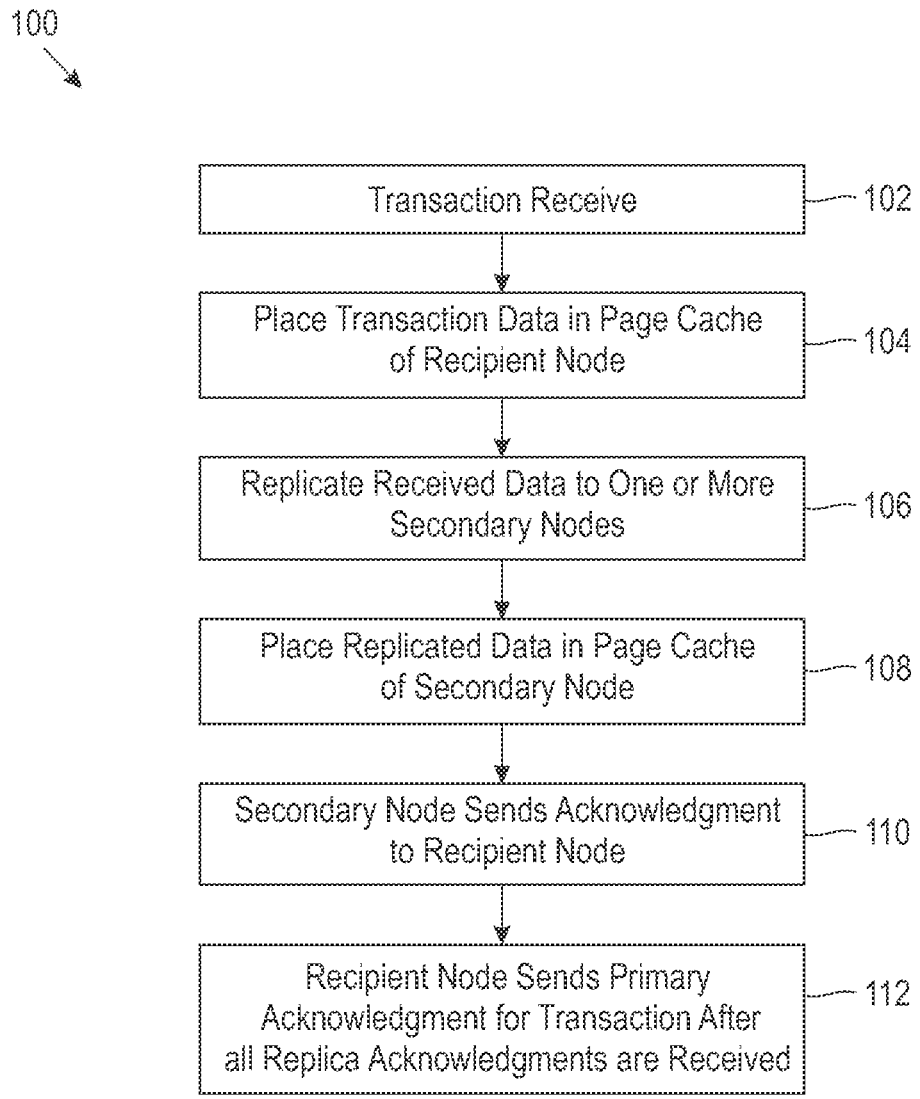
FIG. 1 is a flow chart depicting arrival of a synchronous write transaction to the file system.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The described features, structures, or characteristics may be combined in any suitable manner in one or more embodiments. In the following description, numerous specific details are provided, such as examples of a placement manager, computation manager, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing from the scope of the present invention.

The functional unit(s) described in this specification has been labeled with tools in the form of manager(s) and a director. The tools may be implemented in programmable hardware devices such as field programmable gate arrays, programmable array logic, programmable logic devices, or the like. The tools may also be implemented in software for processing by various types of processors. An identified tool of executable code may, for instance, comprise one or more physical or logical blocks of computer instructions which may, for instance, be organized as an object, procedure, function, or other construct. Nevertheless, the executable of an identified tool need not be physically located together, but may comprise disparate instructions stored in different locations which, when joined logically together, comprise the tools and achieve the stated purpose of the tools.

Indeed, the executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of a placement manager, an invalidation manager, a fault manager, a recovery manager, a transfer manager, a director, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

File system cache of a clustered storage system is integrated with a stable distributed memory layer. This integration enables efficient acknowledgement of synchronous write transactions, which include any transaction that requires updated data to be physically stored on stable storage, e.g. disk, ssd, prior to responding to a client request. In one embodiment, the synchronous write transaction includes a commit transaction. Specifically, the integration enables maintenance of committed data in the file system cache and a delay of flushing the committed data to a disk subsystem. At the same time, the integration guarantees that the data is not lost due to a cluster node failure or a power failure. Accordingly, synchronous write latencies are mitigated.

FIG. 1 is a flow chart (100) depicting arrival of a synchronous write transaction to the file system. As shown, the transaction is received by one of the nodes in the file system (102). Data associated with the transaction is placed in page cache of the recipient node using existing cache policies (104). Page cache is a buffer in memory partitioned into pages, which represent file system blocks in memory. The page cache layer is a software mechanism in the file system that allows file system blocks to be reflected in a memory subsystem, so that accesses to these pages can be satisfied without first having to access physical storage. The received data is then replicated to at least one secondary node in the file system (106). In one embodiment, the secondary node is any node in the file system that is not the recipient node. The quantity of secondary nodes that receive the replication is based on reliability and availability characteristics of the system. For each replication received, the replicated data is placed in page cache of the associated secondary node (108), and the secondary node sends an acknowledgement communication to the recipient node (110). In one embodiment, the replica data is in persistent DRAM, e.g. flash backed RAM. Once all of the acknowledgement communications for each of the replicas are received, the recipient node sends a primary acknowledgement to the client from which the transaction originated (112). Accordingly, the transaction data is replicated within the cache layer of the file system and acknowledged to the client from whom the transaction originated without flushing the data to a disk subsystem.

There is no change in the behavior of the file system from that demonstrated in FIG. 1 for a synchronous write transaction when an asynchronous write transaction is received. When a commit operation is received by the file system, dirty pages are replicated to one or more nodes in the file system. After replication is acknowledged from each of the node to which the data has been replicated, the commit is acknowledged back to the client that originated the commit operation. Accordingly, the data associated with the commit operation is replicated in the cache layer of one or more replica nodes and acknowledged to the originating client without flushing the data to a disk subsystem.

As demonstrated in FIG. 1, committed data is maintained in the cache layer of the file system and flushing of the data to a disk or disk subsystem is delayed. At the same time, persistent characteristics of the cache layer, e.g. battery backed DRAM, flash backed DRAM, or flash devices, ensure that the committed data is not lost due to a datacenter power failure, and replication ensures that the committed data is not lost due to a cluster node failure.

The file system includes two or more nodes in communication with a disk subsystem or data center. As demonstrated in FIG. 1, for data received from a synchronous write transaction, a replica is maintained on at least one replica node. A distinction is made between a master copy of the data and a replica. Specifically, a master copy holds an exclusive cluster-wide write lock on the data, and the replica node holds a shared cluster-wide write lock on the data. As such, the copies are distinguished by the characteristics of the locks maintained by the nodes with the data in the associated cache layer. In one embodiment, a master copy is for a select byte range in the cache layer. For example, a select node may be a master copy for a first byte range in the cache layer and a replica copy for a second byte in the cache layer. Accordingly, the cache layer of each node may include both master and replica copies, with each copy distinguished by an associated byte range, and the master copy having an exclusive cluster-wide write lock on the master byte range and the replica copy having a shared cluster-wide write lock on the replica byte range.

Handling an arrival of a read transaction is the same as traditionally done in clustered file systems. In response to the read transaction to the file system, the requested byte-range is read from the local page cache if the data is in the local page cache of the recipient node. Otherwise, if the requested byte-range is in the page cache of any remote nodes, the master copy of the requested byte-range is flushed to a disk subsystem, the data is read from the disk subsystem to the page cache of the recipient node, and the read is serviced from the local page cache.

Figure 2:
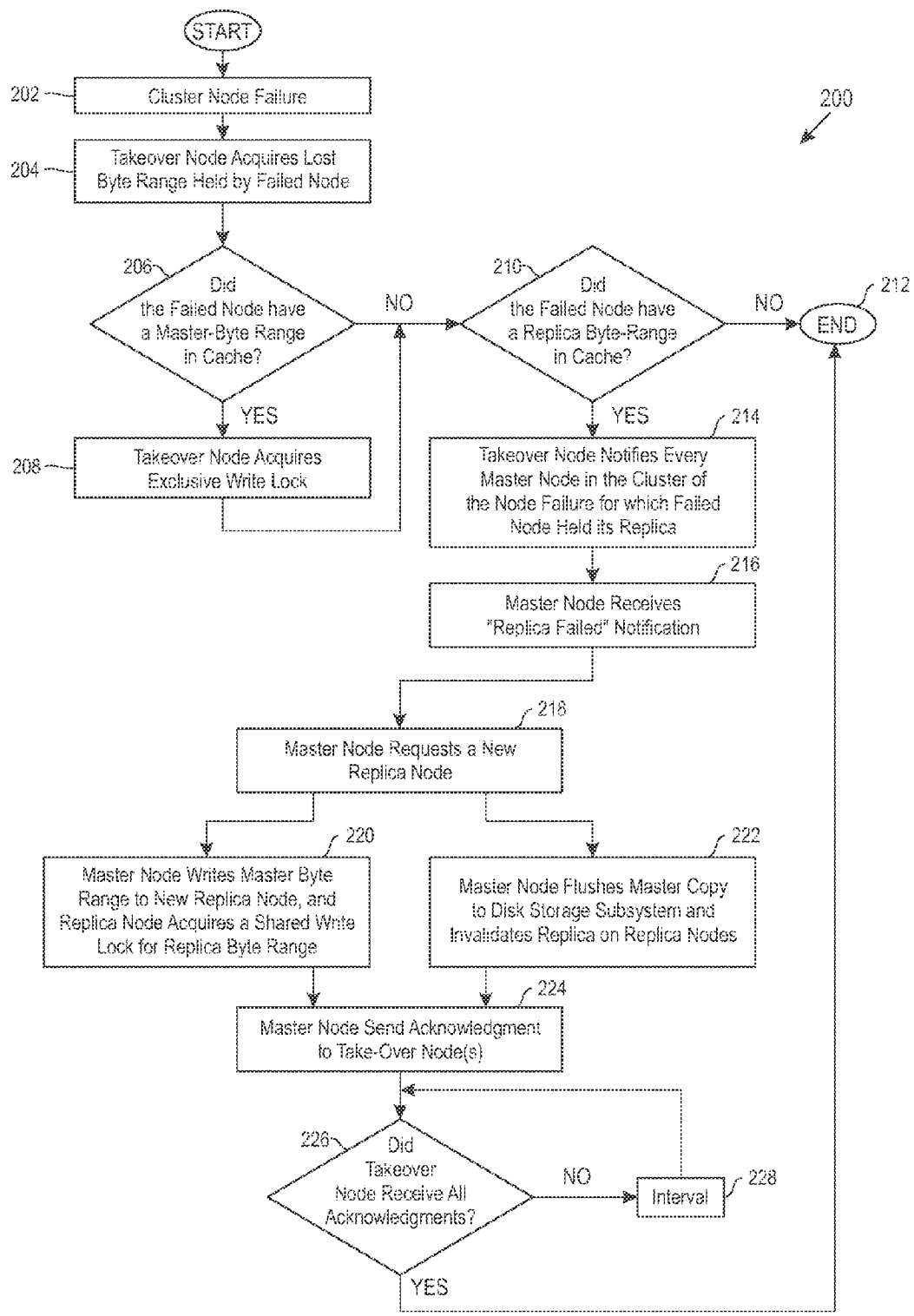
FIG. 2 is a flow chart depicting preventing loss of data when one or more nodes in the cluster have been subject to failure.

One or more nodes in the file system could be subject to failure, including a master node and a replica node. FIG. 2 is a flow chart (200) depicting preventing loss of data when one or more nodes in the cluster have been subject to failure. In response to detection of a cluster node failure (202), one of the nodes, e.g. a takeover node, in the cluster acquires the lost byte-range held by the failed node (204). It is then determined if the failed node had a master-byte range within the lost byte-range in the cache layer (206). If there is a master byte-range present, the takeover node acquires the exclusive write lock for the master-byte range it has acquired (208). Accordingly, in response to a node failure, any node taking over the master-byte range acquires the associated exclusive write lock for the master-byte range.

Following a negative response to the determination at step (206) or acquisition of the exclusive write lock at step (208), it is determined if the failed node had any byte-range in the cache layer designated as replica-range data (210). A negative response to the determination at step (210) concludes resolving any issues with the cache layer of the failed node (212). However, a positive response to the determination at step (210) is followed by the take-over node notifying every master node in the cluster of the node failure for which the failed node held its replica regarding the replica failure (214). The byte range of the failed node may have a plurality of sub-ranges associated with different master nodes in the cluster. For example, the failed node may have a first byte range that is a replica for one master node in the cluster, and a second byte range that is a replica for a second master node in the cluster. For each replica byte-range in the failed node, the associated master node receives a notification of the node failure pertaining to the replica data (216), and the associated master node requests a new replica node in the cluster (218).

Once the new replica node has been designated, the master node may elect one from two alternative actions. The first alternative action is for the master node to write the master byte-range to the new replica node and the replica node to acquire a shared write lock for the replica byte-range (220). The second alternative action is for the master node to flush the master copy of the byte-range to the disk storage subsystem and to invalidate each replica of the byte-range on the replica nodes in the cluster (222). Following the action at either (220) or (222), the master node for the subject byte-range sends an acknowledgement to the take-over node (224), and it is determined if the take-over node has received an acknowledgement from each master node for the byte-ranges in the failed node (226). A positive response to the determination at step (226) concludes the rectification of the node failure (212), and a negative response to the determination at step (226) is followed by waiting for a defined time interval (228) and a return to step (226). Accordingly, the master node for the replica byte-ranges in the failed node institutes one of two actions to either create a new replica node or to flush the data in the subject byte-range to the storage subsystem.

Figure 3:
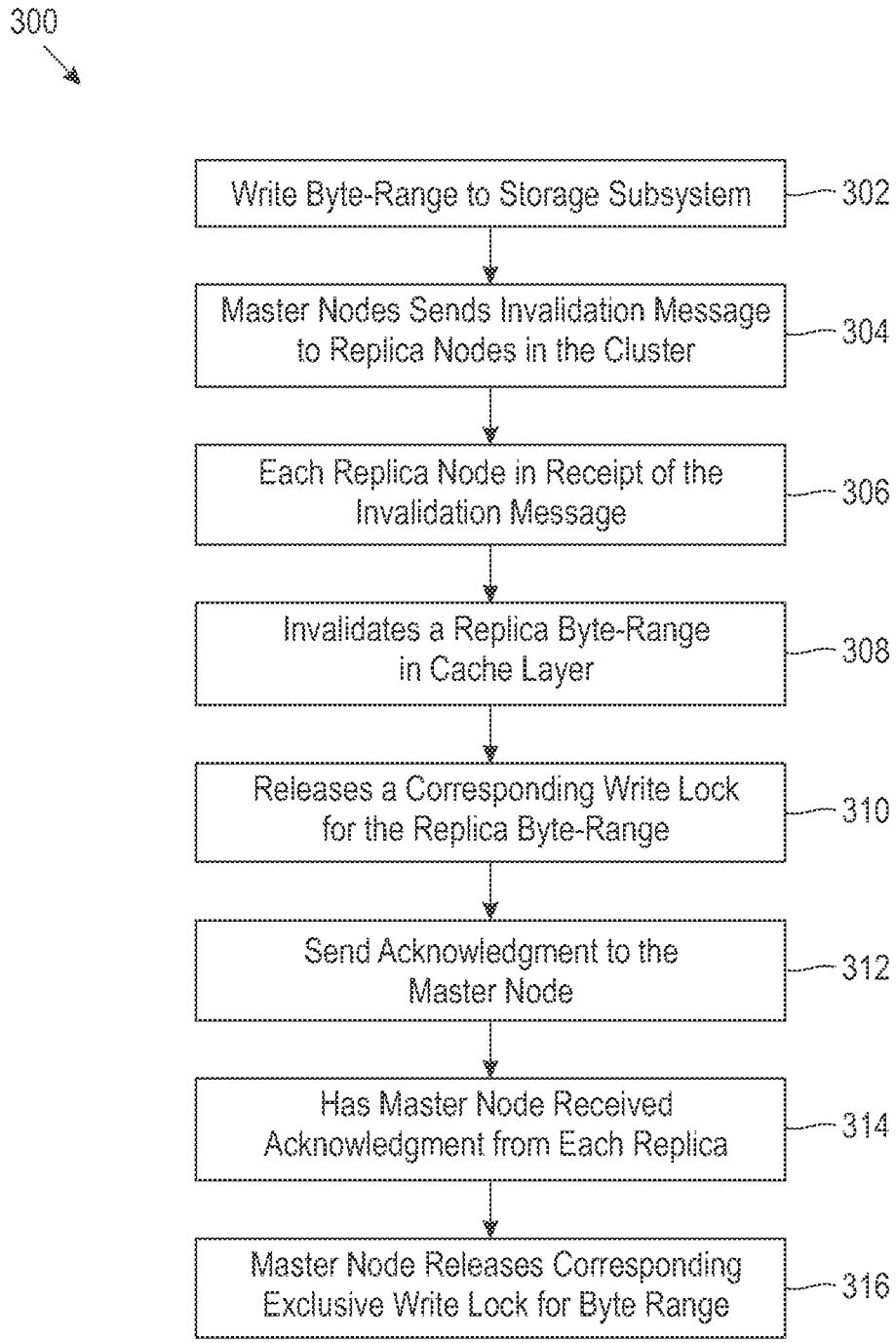
FIG. 3 is a flow chart depicting the master node flushing the master copy of the byte-range to the disk storage subsystem.

As demonstrated in FIG. 2, the master node may flush the master copy of the byte-range to the disk storage subsystem. FIG. 3 is a flow chart (300) depicting the details of this process. The byte-range is written to the storage subsystem (302), after which the master node sends an invalidation message to the replica nodes in the cluster (304). Each replica node in receipt of the invalidation message (306), invalidates a replica byte-range in its cache layer (308), releases a corresponding shared write lock for the replica byte-range (310), and sends an acknowledgement to the master node (312). Once the master node is in receipt of the acknowledgement from each replica node for the byte-range (314), the master node releases a corresponding exclusive write lock for the byte-range (316).

Figure 4:
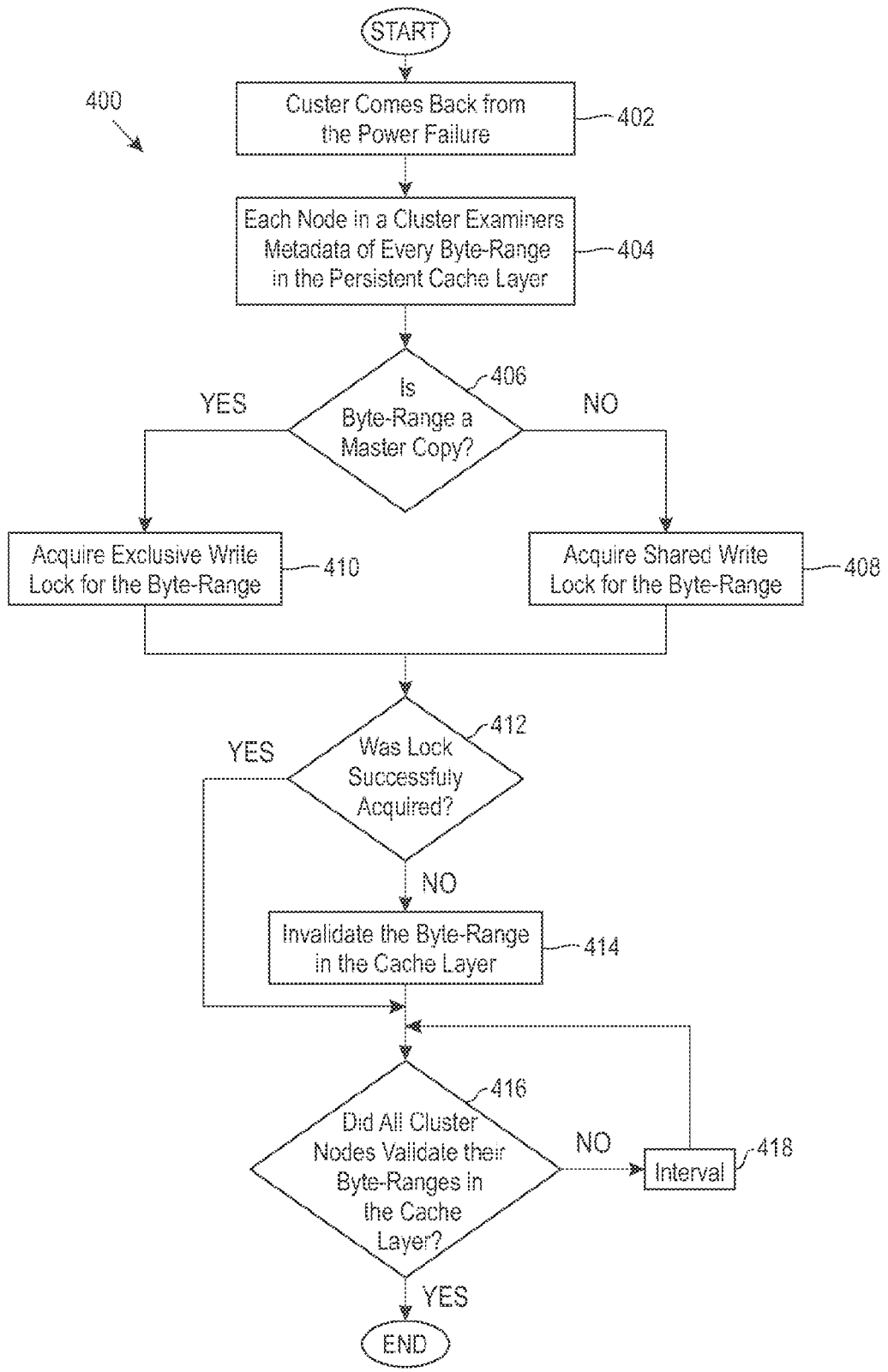
FIG. 4 is a flow chart depicting the process of preventing loss of committed data when the cluster returns from the power failure.

A node in the file system may fail. The cause of the failure is not significant. Rather, it is the manner in which the data in the cache layer is maintained that is significant. One form of failure is when the cluster is subject to a power failure. FIG. 4 is a flow chart (400) depicting the process of preventing loss of committed data when the cluster returns from the power failure. As shown, the process is initiated with the cluster returning from a power failure (402). Each node in the cluster examines metadata of every byte-range in its persistent cache layer, e.g. battery backed DRAM or flash backed DRAM, (404). It is then determined if the byte-range contains a master copy (406). A negative response to the determination at step (406) is followed by the node acquiring a shared write lock for the byte-range (408). In one embodiment, a lock manager assigns the shared write lock to the acquiring node. Conversely, a positive response to the determination at step (406) is followed by the node acquiring an exclusive write lock for the byte-range (410). In one embodiment, the lock manager assigns the exclusive lock to the acquiring node. Following the lock acquisition at either step (408) or (410), it is determined if the lock was successfully acquired (412). A negative response to the determination at step (412) is followed by invalidating the byte-range in the cache layer (414). Following step (414) or a positive response to the determination at step (412), it is determined if all of the cluster nodes validated their byte ranges in the cache layer (416). A negative response to the determination at step (416) is followed by an internal pause (418) and a return to step (416). Once all of the cluster nodes have validated their byte-range in the cache layer, as demonstrated by a positive response to the determination at step (416), the cluster is considered to have returned from the power failure.

Figure 5:
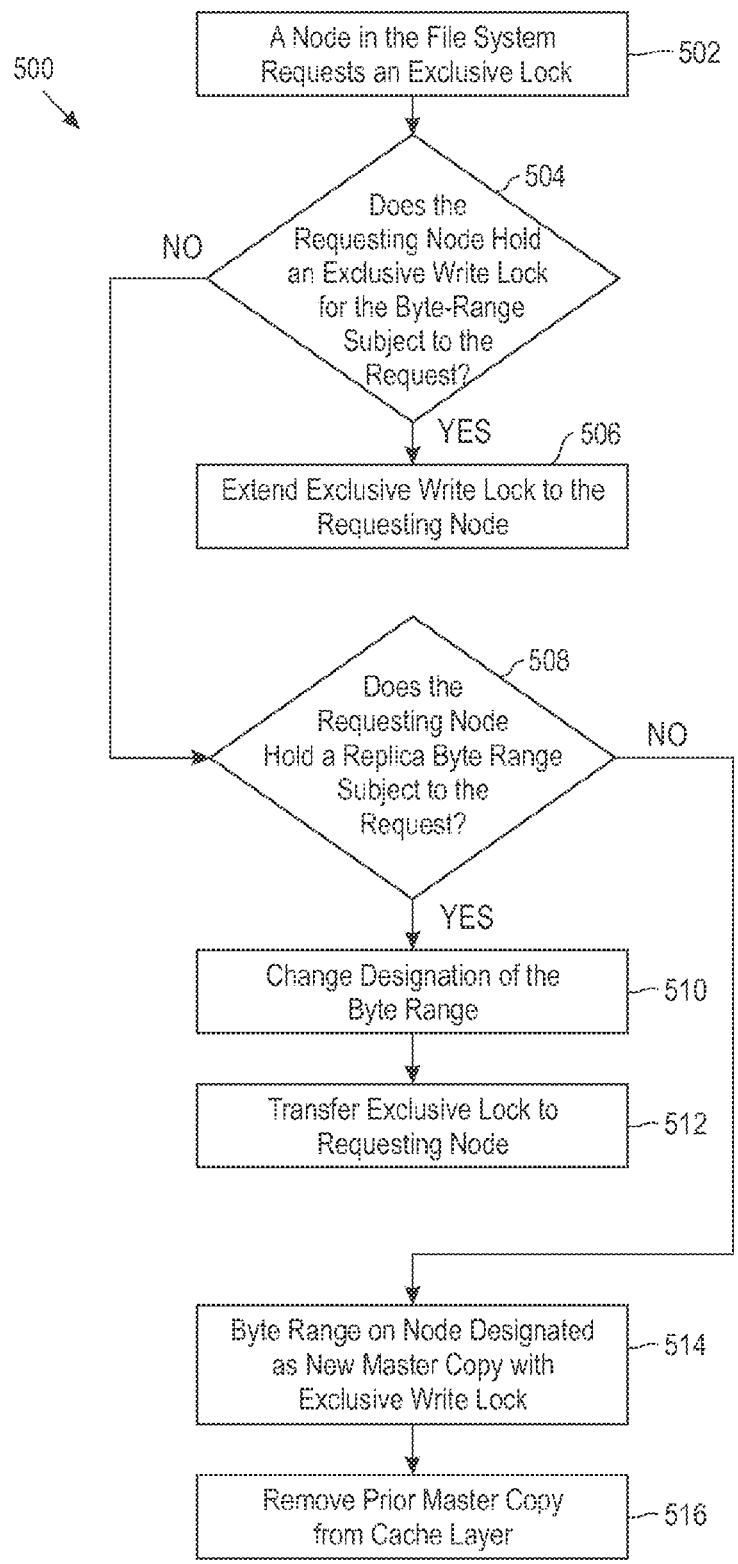
FIG. 5 is a flow chart depicting a process for transferring locks, which may also transfer the designation between a master copy and a replica.

Locks may be transferred among the nodes in the cluster. FIG. 5 is a flow chart (500) depicting a process for transferring locks, which may also transfer the designation between a master copy and a replica. In response to a node in the file system requesting an exclusive write lock (502), it is determined if the exclusive write lock is available for the byte-range that is the subject of the request (504). A negative response to the determination at step (504) is followed by extending the exclusive write lock to the requesting node (506). However, a positive response to the determination at step (504) is followed by determining if the requesting node holds a replica byte-range associated with the lock request (508). A positive response to the determination at step (508) is followed by changing the designation of the byte-range (510) and transferring the exclusive write lock to the requesting node (512). Conversely, a negative response to the determination at step (508) is followed by the byte-range on the node being designated as the new master copy with the exclusive write lock (514) followed by removal of the prior master copy from the cache layer. Accordingly, write locks may be transferred within the file system, together with a designation of the underlying byte-range.

There are several options for managing in-memory replica space. One option is to reserve a separate cache space on each node for replica data, and the master replica may perform space allocation and management for each replica. Another option is not to reserve separate cache space for replica, wherein the replicated write is treated as any other write transaction and can cause page eviction on the replica node. The replica can also be evicted causing the master replica to be flushed to disk.

The system tracks committed but not flushed data and its replicas. If a node holding a master copy fails, a new master replica is elected from existing replicas and a new replica is created. If a node fails with any copy of committed but not flushed data, one more replica to replace a failed node replica is placed on another cluster node. When a crashed node returns, its cache layer is recovered and the cache content of the returned node is discarded since new replicas have been elected. Finally, in the event of a cluster failure, when power is returned the content of the cache on each node is recovered with all committed data in the cache layer then the non-committed data can be invalidated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
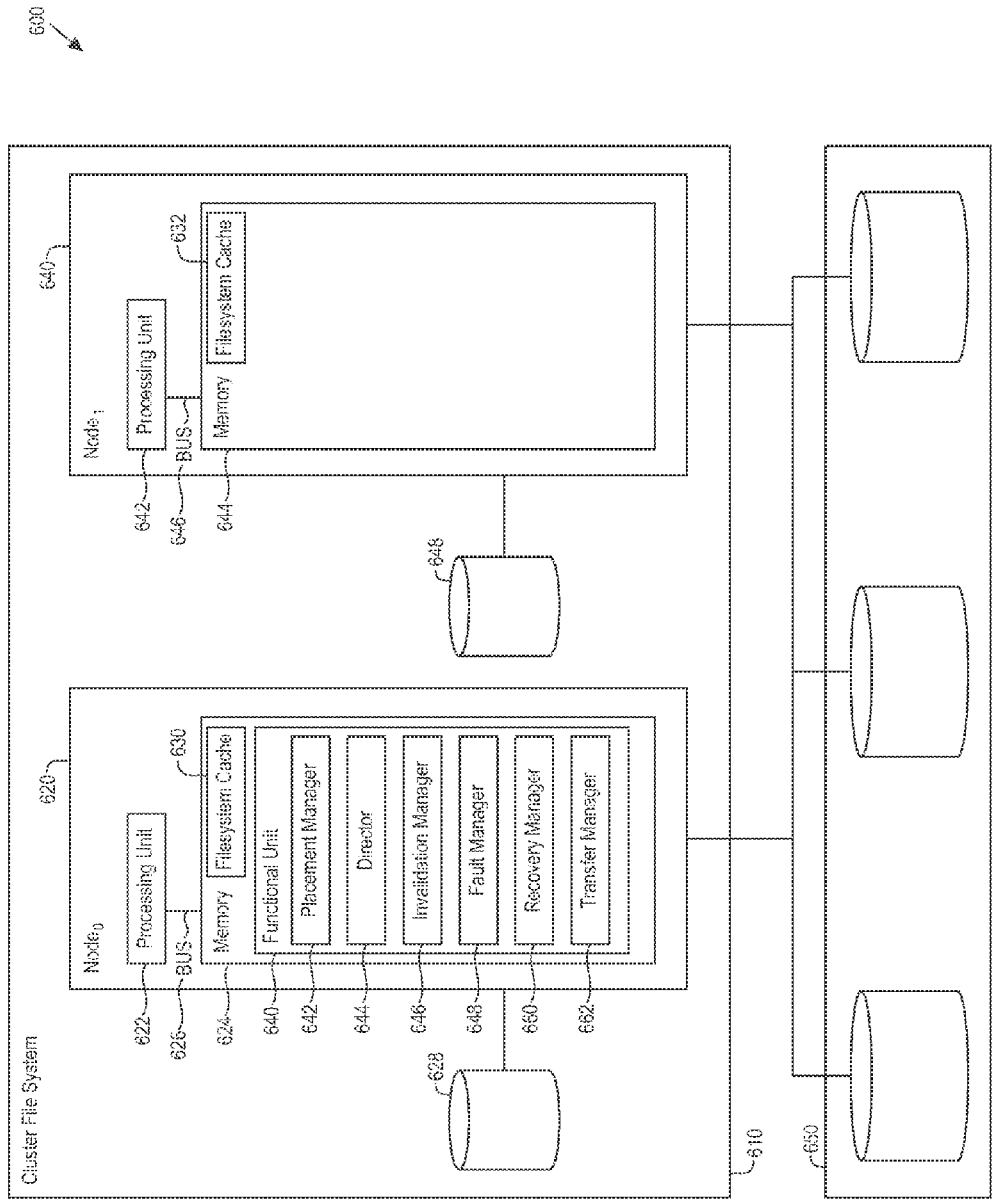
FIG. 6 is a block diagram illustrating a system with tools to support a transaction in a fault-tolerant file system.

As shown in FIGS. 1-5, a method is provided to improve write performance in a fault-tolerant file system. More specifically, the cache layer is configured with persistent RAM to support write transactions and commit operations. Master and replica byte-range within the cache layer have different locks, the master byte-range having an exclusive lock and the replica byte-range having a shared lock. A single acknowledgement communication is sent to the client that originated the write transaction or commit operation, only after all of the replica nodes have acknowledged receipt and storage of the associated data in replica byte-range of the replica node. FIG. 6 is a block diagram (600) illustrating tools embedded in a computer system to support the write transaction or commit operation in the file system. A file system (610) is shown with a plurality of nodes (620) and (640). Although only two nodes are shown, the invention should not be limited to this quantity of nodes in the file system. Accordingly, two or more nodes may be employed to structure the file system.

Each of the nodes is similarly configured. More specifically, $node_0$ (620) has a processing unit (622), in communication with memory (624) across a bus (626), and in communication with data storage (628), and $node_1$ (640) is provided with a processing unit (642), in communication with memory (644) across a bus (646), and in communication with second local storage (648). The nodes (620) and (640) are part of the file system (610) which is in communication with remote data storage (650). Each of the nodes (620) and (640) are shown to reside in a file system (610), and each of the nodes (620) and (640) includes file system cache (630) and (632), respectively, forming a file system cache layer in the cluster (610). In one embodiment, the file system cache (630) and (632) is in the form of persistent dynamic random access memory ("P-DRAM"), flash backed DRAM, or non-volatile RAM ("NVRAM"). Accordingly, the file system cache (630) and (632) is preferably a persistent form of RAM in order to preserve the data in the event of a failure.

A functional unit is further provided within at least one of the nodes, (620) and (640), to support management of write performance in the file system. For ease of description, $node_0$ (620) is shown having a functional unit (640) in communication with the processing unit (622) and having tools embodied therewith to support a write transaction or a commit operations in a fault-tolerant file system. The tools include, but are not limited to: a placement manager (642), a director (644), an invalidation manager (646), a fault manager (648), a recovery manager (660), and a transfer manager (662). Accordingly, tools in the form of managers and a director are provided to support receipt of a write transaction and fault tolerant preservation of associated data within the file system.

The placement manager (642) functions to respond to a transaction in the form of a synchronous write transaction. More specifically, the placement manager (642) places data associated with the received transaction or operation in the cache layer of the file system, and replicates data associated with the received transaction or operation within the file system cache layer. In one embodiment, each node in the file system is provided with a placement manager (642) for received data. The director (644) is provided in communication with the placement manager (642) and functions to distinguish between a master copy and a replica of received data. Different caching techniques are applied by the director (644) to the data associated with the transaction based upon the classification. Accordingly, the placement manager (642) in conjunction with the director (644) manages receipt and placement of data associated with a write transaction or commit operation received by any one of the nodes in the file system.

The invalidation manager (646), fault manager (648), recovery manager (660), and transfer manager (662) are each provided in conjunction with the director (644) to enable further functionality of the fault-tolerant replication of the data. As described in detail in the flow charts of FIG. 1-5, received data is replicated in the cache layer of the file system, with one copy designated as a master copy, and each replication designated as a replica or replica copy. The master copy is identified and associated with an exclusive cluster-wide write lock, and the replica is identified and associated with a shared cluster-wide write lock. The invalidation manager (646) functions to invalidate each replica of the remote nodes in response to flushing the master copy in the file system to persistent storage. Once the master copy is removed from the cache layer, each replica on the remote node(s) may be removed from the cache layer, as the replicas function to support the master copy as long as the master copy is in the cache layer. Accordingly, the invalidation manager (646) functions to maintain the integrity of the cache layer by invalidating each replica for which the master copy has been flushed to persistent storage.

The fault manager (648) is provided in communication with the director (644). The fault manager (648) functions to support the fault tolerance characteristic of the file system. More specifically, the fault manager (648) functions in response to a node failure with the cache layer of the node subject to the failure holding data designated as a master copy. In one embodiment, the cache layer may include an extended byte range with one subset of the byte-range designated as a master copy and another subset of the byte-range designated as a replica. Based on the determination of at least one subset of the byte range on the node subject to the failure designated as a master copy, the fault manager (668) elects one of the other nodes in the file system to acquire the master copy of the data. The elected node acquires the exclusive cluster-wide write lock for the new master copy of the data. In one embodiment, the fault manager (648) employs a node in the cluster that is designated as having the replica of the master copy in the cache layer. In another embodiment, the fault manager (648) facilitates replication of the data to a new secondary node in the cluster and the new secondary node acquires the exclusive cluster-wide write lock. Accordingly, the fault manager (648) facilitates designation of a new master copy in the event of failure of the node holding the master copy.

The recovery manager (660) is also provided in communication with the director (644), and functions to recover content on a recovered failed node, and in another embodiment to recover data in response to recovery of the file system from a power failure. With respect to the recovered failed node, the recovery manager (660) functions to recover content on the recovered failed node by reading data from non-volatile memory of a surviving node. In this scenario, the cluster is not subject to a cluster-wide failure, and as such, at least one node in the cluster is considered to have survived. The surviving node may be the master node of the cluster or an available node in the cluster. Since the byte range in the cache layer is associated with either an exclusive lock or a shared lock, the characteristics of the byte range indicate whether the data therein is a master copy of a replica. With respect to recovery of the file system from a power failure, the recovery manager (660) functions to identify master and replica copies based on characteristics within each byte range. More specifically, the recovery manager (660) validates the master copies and replica copies within the cache layer by re-acquisition of appropriate locks, including an exclusive cluster wide write lock for the master copies and a shared cluster wide write lock for the replica copies. Accordingly, the recovery manager (660) is configured to facilitate recovery of an individual node in the cluster or the cluster from a cluster power failure.

The transfer manager (662) is provided in communication with the director (644). The transfer manager (662) functions to transfer designation of the master copy within the file system. As indicated, the master copy is provided with a cluster wide exclusive write lock for the associated byte range. The transfer manager (662) maintains the exclusive write lock with the master copy. More specifically, if the master copy is transfer to a requester node in the cluster, the transfer manager (662) revokes the exclusive write lock from the original node with the master copy and transfer the exclusive write lock to the requester node. Accordingly, the master copy may be transferred within the cluster, and the transfer manager (662) facilitates the transfer of the master copy by accompanying the transfer with the exclusive write lock across the byte range.

The placement manager (642), director (644), invalidation manager (646), fault manager (648), recovery manager (660), and transfer manager (662) are configured to fault-tolerance in the file system. As identified above, the placement manager (642), director (644), invalidation manager (646), fault manager (648), recovery manager (660), and transfer manager (662) are shown residing in memory (624) of the node (620). In one embodiment, the placement manager (642), director (644), invalidation manager (646), fault manager (648), recovery manager (660), and transfer manager (662) may reside in memory local to one or more of the server nodes residing in the file system. Similarly, in one embodiment, the managers and director (642)-(662) may reside as hardware tools external to memory and may be implemented as a combination of hardware and software, or may reside local to memory of any one of the nodes in the file system. Similarly, in one embodiment, the managers and director (642)-(662) may be combined into a single functional item that incorporates the functionality of the separate items. As shown herein, each of the manager(s) are shown local to one node in the file system. However, in one embodiment they may be collectively or individually distributed across two or more node in the file system and function as a unit to address and maintain fault-tolerance. Accordingly, the managers and director may be implemented as software tools, hardware tools, or a combination of software and hardware tools.

Figure 7:
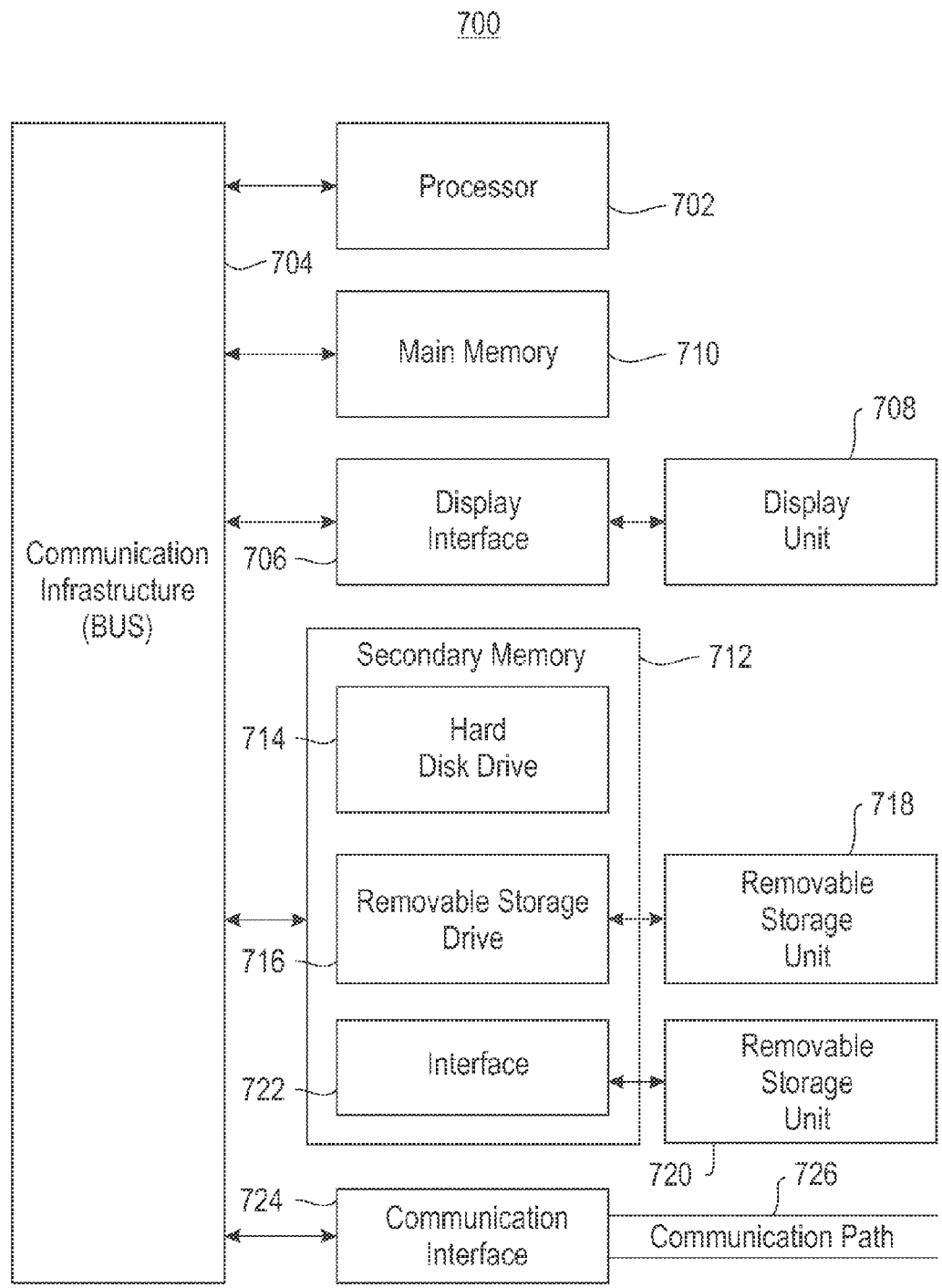
FIG. 7 depicts a block diagram illustrating a system for implementing an embodiment of the present invention.

Referring now to the block diagram (700) of FIG. 7, additional details are now described with respect to implementing an embodiment of the present invention. The computer system includes one or more processors, such as a processor (702). The processor (702) is connected to a communication infrastructure (704) (e.g., a communications bus, cross-over bar, or network).

The computer system can include a display interface (706) that forwards graphics, text, and other data from the communication infrastructure (704) (or from a frame buffer not shown) for display on a display unit (708). The computer system also includes a main memory (710), preferably random access memory (RAM), and may also include a secondary memory (712). The secondary memory (712) may include, for example, a hard disk drive (714) (or alternative persistent storage device) and/or a removable storage drive (716), representing, for example, a floppy disk drive, a magnetic tape drive, or an optical disk drive. The removable storage drive (716) reads from and/or writes to a removable storage unit (718) in a manner well known to those having ordinary skill in the art. Removable storage unit (718) represents, for example, a floppy disk, a compact disc, a magnetic tape, or an optical disk, etc., which is read by and written to by a removable storage drive (716). As will be appreciated, the removable storage unit (718) includes a computer readable medium having stored therein computer software and/or data.

In alternative embodiments, the secondary memory (712) may include other similar means for allowing computer programs or other instructions to be loaded into the computer system. Such means may include, for example, a removable storage unit (720) and an interface (722). Examples of such means may include a program package and package interface (such as that found in video game devices), a removable memory chip (such as an EPROM, or PROM) and associated socket, and other removable storage units (720) and interfaces (722) which allow software and data to be transferred from the removable storage unit (720) to the computer system.

The computer system may also include a communications interface (724). Communications interface (724) allows software and data to be transferred between the computer system and external devices. Examples of communications interface (724) may include a modem, a network interface (such as an Ethernet card), a communications port, or a PCMCIA slot and card, etc. Software and data transferred via communications interface (724) are in the form of signals which may be, for example, electronic, electromagnetic, optical, or other signals capable of being received by communications interface (724). These signals are provided to communications interface (724) via a communications path (i.e., channel) (726). This communications path (726) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (710) and secondary memory (712), removable storage drive (716), and a hard disk installed in hard disk drive or alternative persistent storage device (714).

Computer programs (also called computer control logic) are stored in main memory (710) and/or secondary memory (712). Computer programs may also be received via a communication interface (724). Such computer programs, when run, enable the computer system to perform the features of the present invention as discussed herein. In particular, the computer programs, when run, enable the processor (702) to perform the features of the computer system. Accordingly, such computer programs represent controllers of the computer system.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the enhanced cloud computing model supports flexibility with respect to transaction processing, including, but not limited to, optimizing the storage system and processing transactions responsive to the optimized storage system.

Alternative Embodiment(s)

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A method comprising:
   integrating a stable memory layer with a page cache layer in a file system to temporarily hold committed data in distributed non-volatile memory of nodes in a cluster;
   in response to receiving a synchronous write transaction in the file system, placing data associated with the received write transaction in the page cache layer and replicating the received data within the page cache layer of one or more remote nodes in the cluster;
   distinguishing between a master copy of the received data and a replica of the received data, including applying existing cache policies to the master copy of the received data; and
   in response to flushing the master copy to persistent storage, invalidating each replica on the one or more remote nodes.

2. The method of claim 1, further comprising the master copy holding an exclusive cluster-wide write lock and the replica holding a shared cluster-wide write lock.

3. The method of claim 2, further comprising maintaining fault tolerance in response to a failure of a node holding the master copy, including electing a remote node to acquire the master copy by acquiring the exclusive cluster-wide write lock for the data.

4. The method of claim 3, further comprising recovering content on the recovered failed node in response to the recovery of the failed node, including reading data from non-volatile memory of a surviving node, wherein the surviving node is selected from the group consisting of: an available node and the master node.

5. The method of claim 2, further comprising transferring designation of the master copy to a requestor node, including revoking the exclusive write lock from the master copy, and transferring the exclusive write lock to the requestor node.

6. The method of claim 1, further comprising in response to recovery of the file system from a power failure, recovering data from non-volatile memory content on each node, and identifying master and replica copies from a characteristic of data byte-range and validating master and replica copies by re-acquiring cluster-wide write locks.

7. A method comprising:
   integrating a stable memory layer with a page cache layer in a file system to temporarily hold data committed to a stable storage in non-volatile memory of nodes in a cluster;
   receiving a synchronous write transaction in the file system, including placing data associated with the transaction in the page cache layer of the file system and replicating received data within the page cache layer;
   maintaining a master copy and a replica of the received data, the master copy having distinguishing characteristics from the replica; and
   applying existing cache policies to the master copy of the received data; and
   invalidating the replica following flushing of the master copy to persistent storage.

8. The method of claim 7, further comprising the master copy holding an exclusive cluster-wide write lock and the replica holding a shared cluster-wide write lock.

9. The method of claim 7, further comprising recovering data from non-volatile memory content on each node, identifying master and replica copies from a characteristic of data byte-range, and validating master and replica copies by re-acquiring cluster-wide write locks, responsive to recovery from a power failure.

* * * * *